United States Patent Office

3,287,151
Patented Nov. 22, 1966

3,287,151
METHOD OF MAKING LUMINESCENT SCREENS
Alfred E. Bishop and Edith E. Mayaud, Lancaster, Pa., assignors to Radio Corporation of America, a corporation of Delaware
No Drawing. Filed Dec. 7, 1962, Ser. No. 242,902
9 Claims. (Cl. 117—33.5)

This invention is directed to a method of making luminescent screens for electron tubes.

In certain electron tubes, such as, for example, an image tube, it is important that the phosphor layer comprising the luminescent screen thereof be of microscopically uniform thickness and fine texture. It is moreover desirable that the screens have good light output efficiency. Luminescent layers of evaporated phosphor are of fine texture and uniform thickness, but are relatively low in light output efficiency. On the other hand, layers of luminescent phosphor particles laid down according to known settling techniques, have relatively high light output efficiency, but are relatively coarse and loosely packed and thus lack the desired fine texture and uniform thickness.

In making luminescent screens by settling phosphor particles through a liquid cushion or pool, the value of a gellation agent has long been recognized. The practice has been to have the gellation agent present in the liquid settling pool during the actual settling of the phosphor particles. Although this procedure produces the desired, and intended, adherence of the phosphor particles to the substrate, it causes the particles to aggregate while they are settling, and thus produce coarse textured screens of microscopically nonuniform thickness. While this is not detrimental to television picture tubes, it severely limits the usefulness of certain special purpose devices such as image tubes.

It is therefore an object of this invention to provide a new and improved method of making a luminescent screen which comprises a fine textured, uniformly thick layer having relatively high light output efficiency and which has adequate adherence to its substrate.

It is another object of this invention to provide a new and improved method of making luminescent screens of small coherent phosphor particles which adhere to a substrate in a densely and uniformly packed layer.

We have found that in order to obtain a phosphor screen of maximum image resolving capability for a given phosphor particle size, the phosphor particles should be applied to the substrate in a relatively aggregate-free state. In accordance with this invention, phosphor particles of the desired size and composition are suspended in a liquid medium such as water. The suspension is made to have a high degree of dispersion namely, above that at which flocculation visible to the naked eye occurs. With the phosphor particles so dispersed, a pool of the suspension is deposited on a desired substrate. The suspension medium is then removed from the substrate without substantially increasing the aggregation of the phosphor particles prior to their being deposited in a layer on the substrate. Preferably, after deposit of the suspension onto the substrate the phosphor is permitted to settle out of the suspension medium without the aggregation of the phosphor particles being substantially increased. Then, gellation, or cohesion of the settled phosphor particles is induced. The supernatant suspension medium is then removed from the substrate and the screen dried.

The particle size and percentage concentration of phosphor in the suspension medium is not critical insofar as operability of the screening method is concerned. To obtain screens of the highest image resolving capability, however, phosphors of small particle size should be used. The desired fineness of screen texture, the required light output efficiency and suspension processing considerations of a particular application determine the choice of particle size.

Satisfactory screens of high image resolving capabilities have been made using 0.3–0.5 micron size particles of zinc orthosilicate phosphor or 3.0 microns and less size particles of zinc sulfide phosphor. Screens made from zinc orthosilicate phosphor particles of 0.3–0.5 micron size in image tubes have been measured to have a resolution capability of 190 line pairs/millimeter. Image tube screens made from zinc sulfide phosphor particles of not over 3.0 micron size have been measured to have a resolution capability of over 130 line pairs/millimeter. By comparison, standard commercial settled zinc sulfide image tube screens have an upper limit of about 50 line pairs/millimeter.

Both the upper and lower limits of phosphor concentration in the suspension are primarily governed by practical considerations. If too low a concentration is used, either excessive amounts of the suspension are needed to obtain a given screen thickness, or else undesirably thin phosphor layers are produced. Generally speaking, a suspension of as high a concentration as practical is desired so as to speed up the screening process by allowing one application to achieve the desired screen weight. However, where a specific screen thickness or screen weight/unit area is desired, the upper limit of phosphor concentration may be primarily determined by practical considerations, such as ease of spreading of the suspension onto the substrate. If the suspension is too concentrated, and a screen of certain weight is to be made, the amount of the suspension which must be used may be too little to permit easy distribution of the suspension over the substrate.

To make screens having a weight of 1 milligram/square centimeter, a suspension having a phosphor concentration of about 10 milligrams of phosphor for each milliliter of suspension is preferred. A range of from 1 to 15 milligrams of phosphor for each milliliter of suspension has been found to be suitable for producing satisfactory screens. This range of concentration usually permits a screen of desired weight to be made without requiring more suspension than can be maintained in a pool confined in the prescribed area by its surface tension forces alone, i.e., a relatively shallow pool less than 0.25 inch deep. However, this range of concentration is not to be taken as a limit of the operability of the method of this invention. Where the weight of the screen to be made permits use of a shallow pool of the suspension, such use is preferred for practical reasons. A shallow pool results in more rapid completion of both the settling of the phosphor particles and the removal of the supernatant suspension liquid.

Where the substrate is curved, i.e., dish-shaped, for example, it may be desirable to apply a deeper pool of a more dilute suspension in order to obtain a phosphor layer which is more uniformly thick from its edge to its center. This amount of suspension may be too great to be held by surface tension forces alone. Therefore, the use of a container wall may be necessary.

Liquids which are suitable in conventional prior art settling systems, are generally suitable for use as the suspension medium in the present invention. For example, water, certain alcohols, and acetone are suitable. Water is preferred. The suspension medium should be nonreactive with the phosphor and other materials, if any, which are added to the suspension. It should permit obtaining of the desired dispersion of the phosphor, and should be removable from the substrate after the phosphor has settled out.

In providing the liquid suspension, the degree of dispersion is made to be in the range from just above that at which visible flocculation occurs up to a maximum degree of dispersion. The phosphor particles are maintained in such a state of dispersion during settling to thereby avoid aggregates. This desired degree of dispersion may be obtained by expressly manufacturing the phosphor material to contain a given concentration of a particular dispersant, or deflocculant. Some particles such as those with lyophilic properties may need no dispersant. Alternatively, a dispersant may be added after the suspension has been prepared.

In the case of a zinc sulfide phosphor, suitable dispersants include, for example, sodium pyrophosphate, sodium metasilicate, and sodium lignin sulfonate. Suitable dispersants for zinc orthosilicate phosphor include, for example, sodium pyrophosphate and ammonium hydroxide.

As an example of the use of a dispersant to obtain a desired state of dispersion, good secreens have been made by adding sodium metasilicate to an aqueous suspension of zinc sulfide to produce a pH of between 7.75 and 11.0. However, to keep inert material in the screen to a minimum and still have good settling, rewet adherence, and handling qualities, a pH of around 8.5 is preferred.

As an optional, additional step prior to the use of a dispersant, the phosphor suspension may be processed to remove aggregation-inducing impurities. For example, the suspension may be passed through a suitable ion exchange resin according to known practices.

In depositing the prepared phosphor suspension onto a selected substrate, the desired amount of suspension should be flowed onto the substrate in a single, continuous flow. When the flow of the suspension is interrupted and then begun again, momentary, premature settling of the suspension at a perimeter of limited area well within the area to be screened may occur and produce nonuniformities in the screen. A wetting agent such as glycerol or ethylene glycol may be added to the suspension to increase the wetting and/or flowing properties of the suspension onto the substrate so that spreading of the suspension over the substrate is more rapid and less likely to be interrupted.

After the phosphor particles have settled out of the suspension, and before the supernatant suspension medium is removed, gellation of the phosphor layer, i.e., cohesion of the phosphor particles to each other and to the substrate, is induced. The gellation may be produced by adding a suitable electrolyte (flocculant) directly to the supernatant liquid. The electrolyte may, for example, be in the form of a solid crystal, a liquid solution, or a gas. It has also been found that if the settled phosphor layer and the supernatant liquid is left undisturbed for a long enough time, gellation may spontaneously ocur. It may be that ambient gases, e.g. carbon dioxide, from the atmosphere slowly diffuse into the supernatant liquid and thus provide the desired electrolyte.

In those cases where a liquid solution or solid electrolyte is added to the supernatant liquid it should be done very carefully so as not to disturb the settled phosphor layer. Such can be accomplished by directing a fine spray of a solution of the electrolyte at the supernatant pool or by adding either a quantity of the solution or the solid electrolyte at the edge of the supernatant pool, perferably only at one point. When electrolyte is added at a plurality of points, boundary lines of the different gellation areas sometimes develop across the screen.

Suitable electrolytes include, for example, soluble salts such as ammonium acetate or barium acetate used either in solid or solution form. Suitable gaseous electrolytes which may be diffused into an aqueous supernatant liquid to cause gellation include, for example, carbon dioxide and acetic acid vapors.

Removal of the supernatant suspension liquid after gellation of the phosphor layer is completed may be accomplished in a variety of ways. The supernatant liquid may, for example, be evaporated, suctioned off, or decanted. Evaporation of the supernatant liquid may be carried out at room temperature, at elevated temperature, by application of heat, in vacuum, and/or in a desiccating atmosphere. Suctioning may be performed, for example, either by vacuum sucking through a pipe (such as a hypodermic needle) by use of an aspirator or by absorption into a wick or the like. Ordinary smoking pipe cleaners and filter paper have, for example, been used.

In removal of the supernatant pool either by suctioning or decanting, a residue of liquid is left in the settled layer of phosphor which eventually is removed by evaporation. For this reason, and because of the extreme care which must be observed in suctioning and decanting to avoid disturbing the settled phosphor layer, the evaporation process may, in some cases, be preferred. However, suctioning and decanting of the supernatant pool offer the advantage of rapid removal of most of the pool, and, if carefully done, result in equally satisfactory screens.

In removal of the supernatant pool by evaporation, the evaporation rate, especially in the final stages of evaporation, should be kept low. Otherwise, visible drying lines may occur in the resultant phosphor layer. These drying lines comprise undesirable variations of thickness in the dried layer. We have found that such drying lines can be reduced by the addition of an agent (humectant) to the suspension medium so as to decrease the volatility of the medium and thereby lower its evaporation rate. Suitable humectants are those materials which: (a) will dissolve in the suspension medium; (b) have a relatively high boiling point; (c) are nonreactive with the particular phosphor suspension including the dispersant or flocculant, if such is used; and (d) are removable from the finished screen such as by vaporization at elevated temperatures or by dissolution by a solvent. Examples of such materials are ethylene glycol and glycerol. Since these same materials have also been found to advantageously increase the flow properties of the suspension onto the substrate, as hereinbefore described, they act to serve a double function.

If too much of the humectant is added, nonadherence of the phosphor to portions of the substrate may occur. Moreover, effects such as encountered when no humectant is used, may also occur if too much is used. That is, the drying will occur in waves, so that a limited area of the deposition will first dry, then an adjacent area, and so on. Such drying results in a layer characterized primarily by thin and uneven coverage which usually includes complete voids visible to the naked eye.

In the case of ethylene glycol, a preferred humectant, satisfactory screens may be obtained using from about 0.8 to 1.2 milliliters of ethylene glycol/gram of suspended phosphor.

In evaporating the supernatant liquid with the application of heat, the manner of heating is not critical. However, consideration should be given to the specific drying temperature and drying rate. Satisfactory drying may be obtained simply by placing the substrate on a standard electrical resistance hot plate heater, or by heating the substrate with infra red radiations. If the latter heating means is used, it may be desirable to place the substrate on a massive metal support plate so as to insure better temperature uniformity.

In drying down the screen by elevated temperatures, a range of from 20° C. to 40° C. has been found satisfactory. When a suspension medium of water and ethylene glycol is used, a temperature of about 35° C. is preferred. These temperatures are those measured with a surface thermometer at the surface of the hot plate or massive support plate. During drying, care should be taken to avoid any undue vibration or disturbance of the suspension which might cause uneven drying with resulting undesirable defects, i.e., formation of clumps, holes, drying lines, and patterns.

Specific examples of the method of this invention using two representative classes of phosphor, viz., sulfides and silicates, are set forth below:

Example 1

An aqueous suspension of zinc sulfide phosphor particles in the 3 micron and less size range is prepared by standard milling and sedimentation separation techniques. Sodium metasilicate solution (a dispersant) is added to the suspension to adjust and maintain the suspension at a pH of about 10.5 to obtain a good dispersion. The suspension is diluted if necessary to provide a phosphor concentration of about 10 milligrams phosphor per milliliter of suspension.

The suspension may then be ultrasonically agitated. Just before application to the substrate, the pH of the suspension is reduced to about 8.5–9.0 by the addition of ammonium acetate (gelling agent) to obtain a degree of dispersion of the suspension in the desired range just above that at which flocculation occurs, as hereinbefore described. Ethylene glycol is then added to the suspension in an amount equal to 1 milliliter ethylene glycol per gram of phosphor and thoroughly mixed therewith.

A flat glass faceplate 2 centimeters in diameter, mounted in a metallic rim, is placed on a hot-plate-type heater. A 3.14 milliliter quantity of the suspension is then deposited by a single continuous flow into a shallow pool onto the faceplate from a pipette disposed thereabove. The phosphor is permitted to settle out of the suspension and onto the faceplate while the hot plate is raised to and maintained at a surface temperature of about 35° C. until the supernatant liquid is evaporated and the screen dried. By virtue of the pH adjustment given the suspension prior to its deposition onto the faceplate, gellation of the settled phosphor layer is obtained.

Example 2

The procedure of Example 1 is followed except that the addition of ammonium acetate is omitted and a smaller amount of sodium metasilicate is added so as to bring the suspension directly to the desired pH of about 8.5–9.0.

Example 3

The procedure of Example 1 is followed except that the supernatant liquid is removed by evaporation under vacuum without the addition of heat instead of being heated on a hot plate.

Example 4

The procedure of Example 1 is followed except that the supernatant liquid is removed by evaporation under vacuum while heated by infra red radiation instead of being heated on a hot plate at atmospheric pressure.

Example 5

A suspension is prepared and deposited on a substrate as described in Example 1. After 1 hour, during which time the phosphor has settled from the suspension and partial gellation thereof spontaneously occurred, the supernatant liquid is poured off and the screen air dried at room temperature.

Example 6

A suspension is prepared and deposited on a substrate as described in Example 1. After 2 hours, during which time the phosphor has settled from the suspension, approximately one drop of 1.0% ammonium acetate solution per milligram of settled phosphor is carefully added to the supernatant pool at one point at the edge thereof. After 2 more hours, the supernatant liquid is carefully poured off and the screen air dried at room temperature.

Example 7

The procedure of Example 6 is followed except that the supernatant liquid is carefully sucked off through a hypodermic needle with an aspirator instead of being poured off.

Example 8

The procedure described in Example 6 is followed with the exception that the supernatant liquid is removed by absorption with filter paper instead of being poured off.

Example 9

The procedure of Example 6 is followed with the exception that instead of ammonium acetate being added drop-wise at the edge of the pool, carbon dioxide is flooded over the pool at the rate of 5 cu. ft./hr. for one hour.

Example 10

The procedure of Example 6 is followed except that the ammonium acetate gellation agent is added by spraying a liquid solution thereof onto the suspension pool rather than by the addition of drops at the edge of the pool.

Example 11

An aqueous suspension of zinc orthosilicate phosphor particles in the 0.3–0.5 micron size range is prepared by standard milling and sedimentation separation techniques. Ammonium hydroxide solution (a dispersant) is added to the suspension to adjust and maintain the suspension at a pH of about 9.0 to obtain a good dispersion. The suspension is diluted as necessary to provide a phosphor concentration of about 5 milligrams phosphor per milliliter of suspension.

Just prior to deposition of the suspension onto a substrate, the pH of the suspension is adjusted to about 7.1 by the addition of ammonium acetate solution to obtain a desired degree of dispersion just above that at which flocculation occurs as hereinbefore described. The suspension may then be ultrasonically agitated. Ethylene glycol is then added to the suspension in an amount equal to 1 milliliter of ethylene glycol per gram of phosphor and thoroughly mixed therewith.

A flat glass faceplace 2 centimeters in diameter, mounted in a metallic rim, is placed on a hot-plate-type heater at 35° C. An 0.19 milliliter quantity of the suspension is then deposited by a single continuous flow into a shallow pool onto the faceplate from a pipette disposed thereabove. The phosphor is permitted to settle out of the suspension onto the faceplate. The hot plate is maintained at a surface temperature of about 35° C. until the supernatant liquid is evaporated and the screen completely dried.

Example 12

A suspension is prepared and deposited upon a substrate as described in Example 11. After 4 hours, during which time the phosphor has settled out of the suspension, 4 drops of 1.0% ammonium acetate solution is carefully added to the supernatant pool at one point at the edge thereof. After 16 more hours, the supernatant liquid is carefully poured off and the screen is allowed to air dry at room temperature.

Example 13

The procedure of Example 12 is followed except that a single solid crystal of ammonium acetate weighing a few milligrams instead of liquid ammonium acetate solution is added at a point at the edge of the supernatant pool.

What is claimed is:
1. The method of making a luminescent screen comprising the steps of:
  (a) forming a suspension of phosphor particles in a liquid suspension medium containing a gellable binder which is substantially entirely ungelled,
  (b) making said suspension to have a degree of dispersion above that at which flocculation visible to the naked eye occurs,
  (c) depositing a quantity of said suspension on a substrate with the dispersion of said suspension maintained at said degree of dispersion, and
  (d) permitting said phosphor particles to settle on said substrate without substantially increasing the aggre- gation of said phosphor particles before said phosphor particles have settled on said substrate,
    (e) gelling said binder, and
    (f) then removing the supernatant suspension medium.
2. The method of making a luminescent screen comprising the steps of:
    (a) forming a suspension of phosphor particles in a liquid suspension medium containing a gellable binder which is substantially entirely ungelled,
    (b) making said suspension to have a degree of dispersion above that at which flocculation visible to the naked eye occurs,
    (c) depositing a quantity of said suspension on a substrate while the dispersion of said suspension is at said degree of dispersion,
    (d) allowing said phosphor particles to settle out of said suspension into a layer onto said substrate,
    (e) gelling said binder, and
    (f) then removing the supernatant suspension medium from above said settled phosphor particles.
3. The method of making a luminescent screen comprising the steps of:
    (a) forming a suspension of phosphor particles in a liquid suspension medium and adding an ungelled gellable binder and a dispersant thereto to provide said suspension with a degree of dispersion above that at which flocculation visible to the naked eye occurs,
    (b) depositing a quantity of said suspension in a single continuous flow onto a substrate and allowing said phosphor particles to settle out of said suspension into a layer onto said substrate, without gelling said binder,
    (c) adding a fluocculant to the supernatant suspension medium above said settled phosphor layer without substantially disturbing said layer to induce gelation of said binder in said layer, and
    (d) removing said supernatant suspension medium from above said gelled phosphor layer.
4. The method of making a luminescent screen comprising the steps of:
    (a) forming a suspension of phosphor particles in a liquid suspension medium containing ungelled gellable binder and adding thereto a humectant to decrease the volatility of said suspension,
    (b) making said suspension to have a degree of dispersion above that at which flocculation visible to the naked eye occurs,
    (c) depositing a quantity of said suspension on a substrate in a shallow pool with the dispersion of said suspension maintained at said degree of dispersion, and
    (d) permitting said phosphor particles to settle as a layer on said substrate without substantially increasing the aggregation of said phosphor particles before said phosphor particles have settled on said substrate,
    (e) gelling the binder in said settled layer, and
    (f) then removing the supernatant suspension medium.
5. The method of making a luminescent screen comprising the steps of:
    (a) forming a suspension of phosphor particles in a liquid suspension medium and adding ungelled gellable binder and a dispersant thereto to provide said suspension with a degree of dispersion above that at which flocculation visible to the naked eye occurs,
    (b) depositing a quantity of said suspension in a single continuous flow onto a substrate in a shallow pool and allowing said phosphor particles to settle out of said suspension into a layer onto said substrate without gelling said binder,
    (c) inducing gellation of said binder in said settled phosphor layer, and
    (d) then removing the supernatant suspension medium from above said settled phosphor layer.

6. The method according to claim 3 and wherein said phosphor is a zinc sulfide phosphor, said dispersant is sodium metasilicate, and said flocculant is ammonium acetate.
7. The method of making a luminescent screen comprising the steps of:
    (a) forming a suspension of zinc sulfide particles in the 3 micron and less size range in an aqueous solution of sodium metasilicate having a pH of about 10.5,
    (b) adding ammonium acetate to said suspension to reduce the pH thereof to within the range of about 8.5–9.0,
    (c) adding ethylene gylcol to said suspension in an amount equal to about 1 milliliter ethylene gylcol for each gram of phosphor,
    (d) depositing a measured quantity of said suspension by a single continuous flow into a shallow pool onto a substrate and permitting said phosphor particles to settle out of said suspension and into a layer onto said substrate, and
    (e) heating said substrate to evaporate the supernatant pool of suspension medium therefrom and dry said phosphor layer.
8. The method of making a luminescent screen comprising the steps of:
    (a) forming a suspension of zinc sulfide particles not over 3 microns in size in an aqueous solution of sodium metasilicate having a pH of about 10.5,
    (b) adding ammonium acetate to said suspension to reduce the pH thereof to within the range of about 8.5–9.0,
    (c) adding ethylene gylcol to said suspension in an amount equal to about 1 milliliter ethylene gylcol for each gram of phosphor,
    (d) depositing a measured quantity of said suspension by a single continuous flow into a shallow pool onto a substrate and permitting said phosphor particles to settle out of said suspension and into a layer onto said substrate,
    (e) adding about one drop of 1.0% ammonium acetate solution for each milligram of phosphor to the edge of the supernatant pool of suspension medium to induce gellation of said phosphor layer, and
    (f) pouring off said supernatant pool from said phosphor layer and drying said phosphor layer.
9. The method of making a luminescent screen comprising the steps of:
    (a) forming a suspension of zinc orthosilicate particles in the 0.3–0.5 micron size range, in an aqueous solution of ammonium hydroxide having a pH of about 9.0,
    (b) adding ammonium acetate to said suspension to reduce the pH thereof to within the range of about 7.1,
    (c) adding ethylene gylcol to said suspension in an amount equal to about 1 milliliter ethylene gylcol for each gram of phosphor,
    (d) depositing a measured quantity of said suspension by a single continuous flow into a shallow pool onto a substrate and permitting said phosphor particles to settle out of said suspension and into a layer onto said substrate, and
    (e) heating said substrate to evaporate the supernatant pool of suspension medium therefrom and dry said phosphor layer.

References Cited by the Examiner

UNITED STATES PATENTS

| | | | |
|---|---|---|---|
| 2,634,217 | 4/1953 | Sanabria et al. | 117—33.5 |
| 2,678,888 | 5/1954 | Evans | 117—33.5 |
| 2,906,639 | 9/1959 | Seats et al. | 117—33.5 |

WILLIAM D. MARTIN, *Primary Examiner.*

S. W. ROTHSTEIN, *Assistant Examiner.*